United States Patent
Kirshenbaum (10) Patent No.: US 8,572,039 B2
(45) Date of Patent: Oct. 29, 2013

(54) FOCUSED BACKUP SCANNING

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 513 days.

(21) Appl. No.: 12/627,935

(22) Filed: Nov. 30, 2009

(65) Prior Publication Data

US 2011/0131184 A1 Jun. 2, 2011

(51) Int. Cl.
*G06F 7/00* (2006.01)
*G06F 17/30* (2006.01)

(52) U.S. Cl.
USPC .......................................................... 707/639

(58) Field of Classification Search
USPC ................................................. 707/639, 803
See application file for complete search history.

(56) References Cited

U.S. PATENT DOCUMENTS

| | | | |
|---|---|---|---|
| 6,839,680 B1 | 1/2005 | Liu et al. | |
| 7,552,223 B1* | 6/2009 | Ackaouy et al. | 709/229 |
| 2003/0101449 A1 | 5/2003 | Bentolila et al. | |
| 2006/0080397 A1* | 4/2006 | Chene et al. | 709/213 |
| 2006/0195417 A1* | 8/2006 | Acharya et al. | 707/2 |
| 2008/0126176 A1 | 5/2008 | Iguchi | |
| 2010/0306236 A1* | 12/2010 | Cychosz et al. | 707/769 |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: The Collective Intelligence Platform, Online, http://www.baynote.com/technology/platform/ 2010.
Hottolink Inc.; "Recognize" Online, http://www.hottolink.co.jp/english/reconize.html, 2009.
Hongjun Lu et al: Extending a Web Browser with Client-Side Mining, Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , 2008.
Shahabi et al.; "Yoda An Accurate and Scalable Web based Recommendation System?" University of Southern California, Los Angeles, Sep. 2001.

(Continued)

*Primary Examiner* — Kuen Lu (57) ABSTRACT

Methods, systems, and computer program products are provided for performing data backup of a file system. A monitoring process is configured to include a file system representation (FSR) representing the file system, the FSR comprising a plurality of nodes, each node corresponding to a respective one of a plurality of elements of the file system. A monitoring process includes a file system representation (FSR) of a file system. The FSR comprises a plurality of nodes corresponding to a respective one of a plurality of elements of the file system. The monitoring process receives a notification of a change to a first element of the file system, caches information associated with a second element of the file system to provide cached information, and processes the FSR in response to the change.

25 Claims, 3 Drawing Sheets

(56) References Cited

OTHER PUBLICATIONS

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; A Framework for Efficient and Anonymous Web Usage Mining Based on Client-Side Tracking, 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

\* cited by examiner

FOCUSED BACKUP SCANNING

BACKGROUND

A technique to lessen the risk of loss of data includes adopting a redundancy policy that provides periodic back up of data stored on a primary data storage device to a backup storage device for safe-keeping. If the data that is to be backed up is regularly copied to the backup storage device, a recent copy of the data may be restored in the event the data is lost from the primary storage device. When performing data backup, one of the key questions is "What data should be backed up?" In many systems, this involves considering each file that is in the scope of the information that is to be backed up and making a decision as to whether or not it needs to be backed up. That is, determine whether a back-up copy for the data already exists. As file systems get larger, the backup process may take a long time, as each file needs to be accessed to at least extract metadata as to the last time it was modified, and this often results in a higher load that may make the system unresponsive.

BRIEF DESCRIPTION OF THE DRAWINGS

Embodiments of the invention relating to both structure and method of operation may best be understood by referring to the following description and accompanying drawings.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system. For example, nodes of a tree may be configured to be processed in a preorder, a postorder, or an inorder manner.

File system—Tools and techniques deployed by a computer system for organizing, storing, manipulating, and accessing computer files and the data contained therein. A file system may typically include a structured arrangement of elements such as files and directories. As described herein, a file refers to any element of a file system. A file can also refer to a directory, folder, or path in which data is located. A file can also refer to one part of a larger file, such as a file collected within an archive, an e-mail message, an attachment of an e-mail message, and so forth. Examples of a file include one or more of the following: a document (such as a document produced or edited by a software application), a collection of data, a sequence of data, a program, a database record, or any other grouping of data. Attributes of an element of the file system may generally describe characteristics of the element such as name identifier, owner, element type, access privileges, date modified, size, and others. A path name may generally specify a reference to a location (physical, logical, or virtual) of an element of the file system.

Scanner—An instrument, device or module operable to perform a scan for sensing data. For example a backup scanner may be configured to scan a file system to determine whether the data associated with the file system is changed. Other types of scanners may be used for information technology (IT) applications such as data synchronization, metadata extraction, indexing, and virus/spyware checking.

Directed Acyclic Graph (DAG)—A DAG may be described as a directed graph that contains no cycles. A DAG, which generally includes flows in one direction, may appear in models where it may not make sense for a vertex to have a path to itself. A rooted tree may be viewed as a special kind of DAG and a DAG is a special kind of directed graph. A file system may be represented by a DAG, and as a special case by a rooted tree.

Systems and methods for performing data backup are disclosed herein that provide mechanism for scanners to focus on parts of a file system that have changed since a previous scan, and enables the scanners to cache information about the files, the information being deleted when the file changes. The improved mechanism reduces an amount of time required for the data backup. Many backup systems may simply do a recursive walk (or traversal) of the directories they are responsible for. For each file and directory, the backup systems make a decision about whether the backup system already has a copy of the data, and, if not, the current file is sent to the backup system. In some cases sending data to a backup system may mean simply copying the file to a backup location. Typically, the decision is made based on the path of the file as well as some other metadata such as the modification time of the file. One technique to make this decision is to compare this time to the last time a backup was started or completed. If the completion time is used, the modifications between the time a file is sent and the time the backup completes may not be backed up next time. These techniques may not work well, if a backup fails to complete, as it may cause all files sent in one session to be sent again in the next. Another challenge is that many operating systems may allow the modification time to be set explicitly, so a newly modified file may have a modification time that claims to be before the last backup time.

An alternative technique for data backup is to keep track (on the server or locally) of the modification time of the file when last backed up. If the current file's modification time differs from (or, in some systems, is later than) the last one backed up, the file is sent again. This technique may have problems with programs that make sure that the modification time does not change (e.g., by resetting it to its prior value when such a program finishes modifying the file). Some backup programs may evaluate both modification time and size, but even this technique may not work if the modification time is set and the file size does not change. Some techniques may make use of a property of the contents of the file (e.g., a checksum or cryptographic hash), however this technique may require reading the data of every file, which may be very expensive in terms of resource utilization.

In Hash-based Directed Acyclic Graph (HDAG)-based systems, an HDAG needs to be constructed for the entire backed-up system, and this technique may require computing a hash for every file and directory based on content. An HDAG is a directed acyclic graph (DAG) in which pointers are implemented as cryptographic hashes instead of addresses. A cryptographic hash (or more simply 'hash') is a number produced from arbitrarily-sized data by a hash function such that any change to the input data with high probability changes the hash, and such that given the hash, there is low probability that any two data items have the same hash. Examples of hash functions that can be employed include the MD-5 (Message Digest algorithm 5) and SHA (Secure Hash Algorithm) hash algorithms. A current HDAG-based backup client uses a simple cache that maps path name, modification time, and size to the hash of the corresponding node the last time the tree was backed up. This technique may have the problems described above and may also have the problem that if a directory tree is moved, there may not be any corresponding entries in the cache and so potentially large sections of the file system may have to be read and hashed again, only to find out that the backup store already contains them.

Another technique to perform backups is known as 'continuous data protection' (CDP). CDP utilizes the ability of modern operating systems to notify them when certain events, such as the writing, renaming, or deleting of a file, take place. In a CDP system, as soon as a file is closed, the system communicates the change to a backup server. Such systems may have several drawbacks. First, they may require that the system be always coupled to the backup server. This restriction may be unreasonable for laptop computers. Second, such systems may impose overhead immediately rather than waiting until the user is less impacted by it. Third, they may increase network traffic, since often a single file will change many times in quick succession, with the user being unconcerned about preserving intermediate contents. For example, if the requirement is to preserve the last copy, the contents may be sent over only to be deleted almost immediately. Finally, such systems may cause other modules or components to fail. For example, on some systems (e.g., systems based on Windows operating system provided by Microsoft Corporation), a file may not be opened for writing if another process has it exclusively opened for reading. When a file is written, the CDP system may open it to read the contents and send it to the server. If during this time the file is opened again for writing, the write operation may fail.

The systems and methods disclosed herein provide data backup more efficiently and with improved performance. A monitoring process can be configured to include a directed acyclic graph (DAG) representing the file system, the DAG comprising a plurality of nodes with each node corresponding to an element of the file system. A notification of an occurrence of an event indicating a change to a first element of the file system is received by the monitoring process and information pertaining to the change is cached. One or more scanners are configured to focus on parts of the file system that have changed since a previous scan. The scanners are serviced by the monitoring process by deleting the cached information, thereby indicating to the scanners a need to rescan.

Figure 1A:
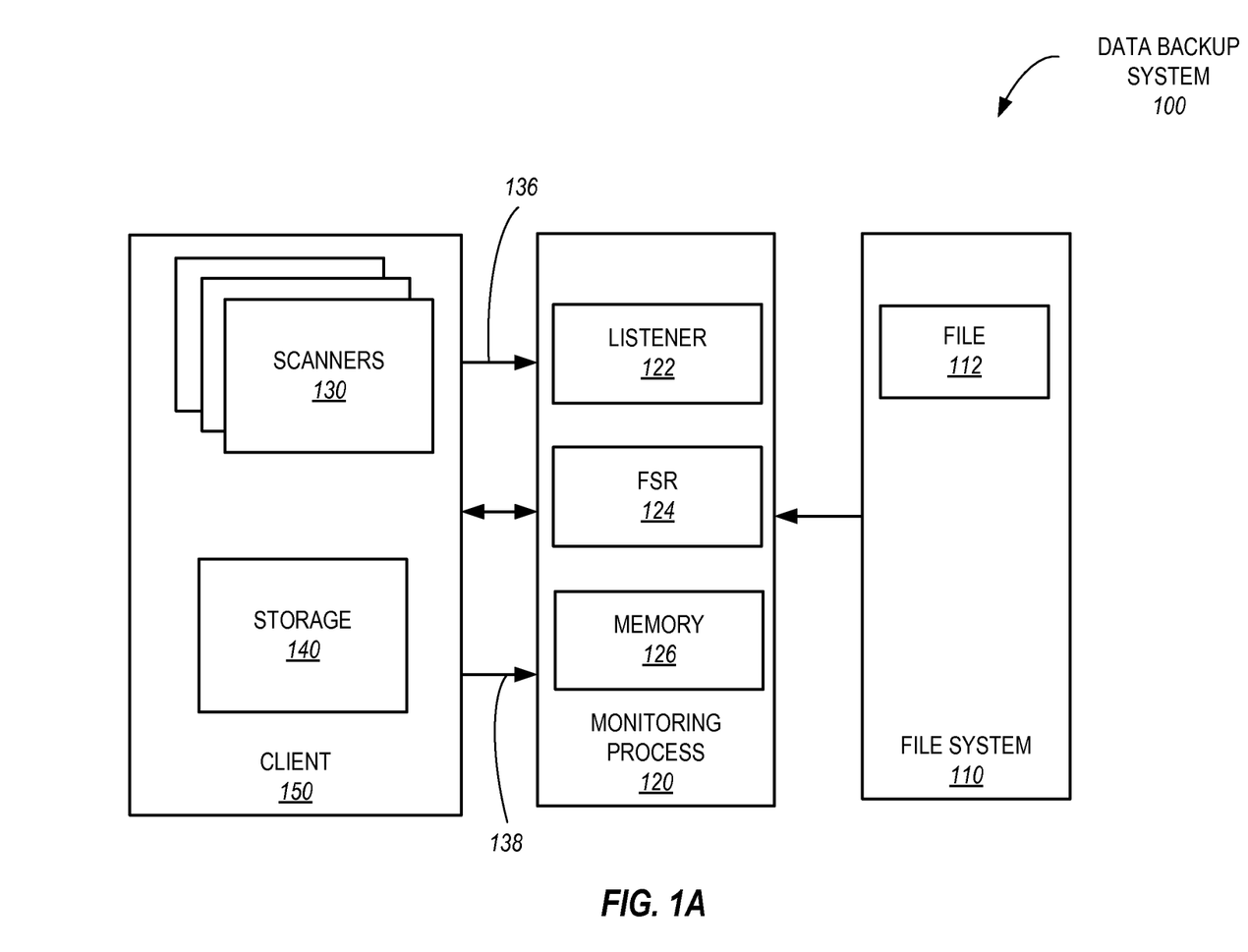
FIG. 1 illustrates an example of a data backup system, according to an embodiment.

FIG. 1 illustrates an example of a data backup system 100, according to an embodiment. The system 100 includes a file system 110 operable to organize, store, manipulate, and access data, a monitoring process 120 operable to monitor the file system 110 for events indicating changes therein, and one or more scanners 130 to focus of portions of the file system 110 that have changed since a last scan. The changes associated with the file system 110 or any element of a file contained therein are communicated by the monitoring process 120 to a corresponding one of the scanners 130 in response to a request from the scanners 130. The monitoring process 120 includes a memory 126 for caching information associated with an element of the file system 110 such as a file 112, the information being deleted in response to a change in the file 112. The scanners 130 are operable to backup data that has changed within the file system 110 and save the data in a backup storage 140, the data being in the scope of the information that is configured to be backed up. As described herein, in some configurations of the system 100, the backup storage 140 may not be a part of (or maintained by) the client 150. In some applications the backup storage may be implemented as a remote server coupled to the client 150 via network, the server containing backup data from several backup clients (for several machines) and possibly other non-backup content.

The monitoring process 120 includes a listener 122 task which is invoked in response to an event indicative of a change in the file system 110 or an element thereof. The listener 122 task may be configured to be registered with the operating system for execution in a background mode. Many modern operating systems may support the listener 122 as a standard feature for monitoring changes in the file system 110. For example, under recent Microsoft operating systems, the Read DirectoryChangesW function may be used to perform the monitoring task, and this may be used by means of the FileSystemWatcher wrapper class. By means of this facility, a process may get notified whenever a file (within a particular part of the file system 110) is created, deleted, changed, or renamed.

The monitoring process 120 maintains a file system representation (FSR) 124 of the file system 110. The FSR 124 may be implemented as (or by using) a DAG, as a tree (a special case of a DAG), as a graph (a generalization of a DAG), or other suitable representation. It is understood that the FSR 124 may be expressed in various forms depending on each application. As described herein, references to the graph and the term 'tree' may refer to any hierarchical graph structure that can be described by a node and the transitive closure of its children. In particular, the term 'tree' may refer to directed acyclic graphs (DAGs), hash-based directed acyclic graphs (HDAGs), and general (possibly cyclic) directed graphs.

As described earlier, in a DAG structure nodes may have more than one parent (and there may be more than one root node). The hierarchical tree structure generally has one root node that is the topmost node in the tree and each node (except for the root node) has only one parent. Nodes at the bottommost level of the tree are called leaf nodes and do not have any children. For illustrative purposes and to clarify concepts and simplify the system 100, the file system 100 may be represented as a tree structure having one root and each node in the tree having only one parent. It is understood that other data structures including DAG/HDAG structures, a flat file structure, and other vendor specific data structures are also contemplated.

The FSR 124 includes nodes coupled to one another to represent the file system 110 with each node corresponding to an element such as a file and directory included in the file system 110. It would be desirable but not required to store the FSR 124 in the memory 126 to improve performance. Each node included in the FSR 124 can include the following: name of the file 112 (unlike other data backup systems a full path to the file is not required), a pointer to the parent (or pointers to the parents) of the node (representing the directory or other context that file 112 appears in within file system 110), pointers to nodes representing each child of the file 112 (for example, files or subdirectories within file 112 when it is a directory), a timestamp representing a last time the monitoring process was notified of a change to the file 112, and typed cached information associated with the file 112. In an embodiment, the typed cached information may be stored in the memory 126. In an alternative embodiment, the name of the file 112 may be stored along with the child pointer to the node representing the file 112 rather than in the node itself, allowing for a file 112 to be known by different names to different parents.

Typed cached information associated with the file 112 may include an identifier (e.g., a four-byte number) that may be used to distinguish one scanner's information from another (and, may also distinguish multiple types of information from one scanner). That is, there may be multiple scanners that cache the same type of information and a single scanner may contain multiple types of cached information. The cached information may also include an indication (e.g., by means of bits in the identifier) that indicates the types of operations that may render the cached information invalid and whether changes propagated up the tree may render the cached information invalid. In some embodiments, there may only be one type of cached information and there may be no explicit identifier.

When the monitoring process 120 is started for the first time, the entire file system 110 may be walked (e.g., in a postorder, preorder, or inorder manner), before the monitoring process 120 starts listening for requests. Before the monitoring process 120 starts walking, however, monitoring process 120 can register its listener 122. In some embodiments, the monitoring process 120 may start listening immediately or may start listening after the initial scan is only partially complete. If the monitoring process 120 gets notified of an event that pertains to a part of the FSR 124 already constructed, the event is processed as described below. If the monitoring process 120 pertains to a part of the tree not yet constructed, the event may be ignored. The timestamps for the initial nodes included in the FSR 124 may be set to the current time when each node is created or the timestamps for all of the nodes in the FSR 124 may be set to a time no earlier than the creation of the last node and no later than the time the monitoring process 120 begins listening. Properties of the nodes included in the FSR 124 are in accordance with the following conditions: (1) the timestamp on a node is no earlier than the last time the node was actually modified, and (2) a node's timestamp is no later than those of its children.

When the monitoring process 120 gets notified of a change in the file system 110 or elements thereof (e.g., a first element corresponding to a first node of the FSR 124, a second element corresponding to a second node of the FSR 124, and others), the notification may include (or the monitoring process 120 may be able to obtain) the full path of the file 112 that was changed and an indication of the type of change. If the change was a renaming of the file 112, the monitoring process 120 may have available both the old and new paths. The monitoring process 120 may find the node corresponding to the file 112 by starting at a root of the FSR 124 and following the path (the old path in the case of a rename). The monitoring process 120 may then modify the node (or another node, such as a parent of the node in the case of a deletion) based on the type of the change. The monitoring process 120 may then update the timestamp for the modified node to reflect the time of the completion of the modification. The monitoring process may then follow parent links to walk up the ancestry of the node (corresponding to enclosing contexts of the file 112), updating these nodes' timestamps to have the same timestamp as the node. If a node has cached information whose type indicates that it should be removed on nested changes, such information is removed.

In an embodiment, the walking of the ancestry may be postponed until all changes received from the file system 110 have been processed. This may be useful when there are many changes to the same file or directory, in order to avoid having to walk the same parts of the tree multiple times. To accomplish this, while there are pending events, the monitoring process 120 maintains an agenda (or list) of nodes whose ancestors need to be walked. When there are no more events pending, the agenda is processed, one event at a time, with all nodes set to the same time (the current time or the timestamp of the last event). To process a node, the desired timestamp is compared to the node's current timestamp. If they are the same, the node has already been processed in this pass. Otherwise, the node's timestamp is updated, a portion of its cached information is cleared, and its parent is processed. In any case, the node is removed from the agenda. If events are received during the processing of a node, the processing of the event is aborted, the new events handled (which are added as nodes to the agenda), and the process is restarted with a new timestamp.

If the event is a deletion of a file, e.g., the file 112 (or directory tree), the monitoring process 120 may find the node corresponding to the file's directory and delete from this node references to the child corresponding to the file 112. In some embodiments, child references to the node corresponding to file 112 may be removed from all nodes referenced as parents of that node. If the event is the creation of a file, e.g., the file 112, the action is similar to a deletion, except a node is created rather than being deleted. The new node has a timestamp, but may not have metadata, and its parent is added to the agenda. If the event is the modification of a file, the appropriate node is found, its timestamp updated, its cache pruned, and its parent added to the agenda. If the event is a renaming, the old path is used to find the node. This node may not change, but the node is removed from its parent node (which may be changed and added to the agenda), and added to the node corresponding to its new path's directory (which may also be changed and added to the agenda), which becomes its new parent. In many cases, the two parents may be the same, but the name of the parents may have changed.

In addition to maintaining the representation FSR 124 (e.g., a tree or the DAG) of the file system 110, the monitoring process 120 acts as a server for other (e.g., local) processes, to handle two types of requests: a snapshot request 136 and a cache request 138.

In a snapshot request 136, a task executing in a client 150 requests a snapshot of the FSR 124 (from some specified root or roots) down to a particular level, the level being specified by a provided timestamp. The semantics may include a request to return a tree (or other representation such as a DAG, list or set) containing all nodes whose parent's timestamp is later than a provided timestamp. In such a returned snapshot some nodes that are non-leaves (e.g., directories) in the full tree may be leaves in the snapshot. This may happen when a directory has been modified since the requested snapshot time, but none of its children have. It may be desirable for such nodes to have some indication of the fact that they are non-leaves in the full tree. Nodes omitted from the snapshot (which, most often, may be a majority of them) based on their timestamps may be uninteresting because they were received and processed the last time the client 150 requested a snapshot. In addition, the snapshot request 136 may include an indication of which cached information is of interest. In an embodiment only this cached information, if present, is added to the snapshot. In some embodiments an access control mechanism may be employed to determine whether the client 150 has appropriate permission to obtain the requested cached information. While the snapshot is being created, the monitoring process 120 may temporarily suspend processing events associated with the file system 110. Alternatively, the monitoring process 120 can continue to process the events, ensuring that any changes are reflected in both the FSR 124 and any snapshots being built. In this embodiment, it may be desirable to wait until the agenda is cleared before returning any snapshots.

In the cache request 138, a task executing in the client may request that the monitoring process 120 cache associations between provided typed information and provided paths in such a way that the information may be retrieved as associated with the files described by the path in a future lookup or snapshot request. For an HDAG-based backup client 150, the primary cached information may be the hash of the root chunk corresponding to the file or directory. The benefit of a content-based data store client 150, especially when used in the chunk-based data store context, is that if the same data item is stored twice (or two data items of identical content are stored), then only a single copy is to be kept, which saves storage space.

In some embodiments, the term 'chunk' refers to a segment of the file, where the chunk is produced by chunking (dividing) the file based on the content of the file (which may result in chunks of varying sizes). Alternatively, chunking of the file can be based on fixed sizes to divide a file into chunks of roughly equal size. In some embodiments, individual chunks may refer to discontiguous regions of a file, as long as it is possible to recreate the file given a complete set of its chunks. If encryption is used, the client 150 may further cache information enabling encryption or decryption of the chunk. When the monitoring process 120 receives such a request, it finds the appropriate nodes and attaches the cached information to them, typically overwriting any old cached information of that type.

It may be preferred that the cached information actually corresponds to the file 112 at the time specified by the node's timestamp. It may become a potential problem if the client 150 grabbed a snapshot and computed the hash, but before it had time to cache the value, the contents of the file 112 changed, and the hash was associated with the file 112, even though it did not correspond to the current version. To avoid this potential problem, the cache request can include a timestamp, and the association may be ignored if the proffered timestamp is no earlier than the node's timestamp. By the rules governing the FSR 124, the timestamp associated with the root of the snapshot is the latest one anywhere in the snapshot, so the snapshot root's timestamp may be used when making cache requests. In some embodiments, the monitoring process 120 may also act as a server to handle lookup requests. In a lookup request, the monitoring process 120 may provide cached information associated with files described by one or more provided paths. In some such embodiments, the cached information provided may be limited to cached information whose type matches a provided indication of desired cached information types.

From the point of view of the backup client 150, an example of the data backup process is as follows: 1) Request a snapshot from the monitoring process 120, providing as a timestamp the root timestamp of the last snapshot. During a first pass, a zero or some other sufficiently early timestamp or a distinguished value may be provided indicating that the client 150 wishes the snapshot to contain all nodes. Also provided with the request is an indication that the client wants cached root chunk hashes. 2) Do a preorder walk (a walk in which each parent is traversed before their respective children) of the FSR 124 representing the file system 110.

The preorder walk of the FSR 124 may include the following: 2a) If a node has a cached root hash, query the HDAG store as to whether it contains a complete HDAG rooted at a node with that hash. If the response is "yes", then ignore the rest of the snapshot below the node. 2b) Otherwise, if the node corresponds to a file (rather than a directory), read the file and compute the HDAG corresponding to it. If a cached root hash was not present (or if the caced root hash was different from the root hash of the computed HDAG), request that the monitoring process 120 to cache the HDAG's root hash as being associated with this file's node. Store the HDAG in the HDAG store. 2c) Otherwise, this may be a directory node, and its HDAG may be based on its metadata and the HDAGs of its children. First process all of the children, which may result in knowing all of their root hashes (and their being in the store). Then read the metadata and construct the HDAG for the directory, down to the links to the HDAG nodes for the directory's contents, and process this partial HDAG as with that of the file in 2b. 2d) If this is a leaf node in the snapshot, but is a directory node and none of the preceding options succeeded, then it implies that the stored value may unexpectedly not exist in the HDAG store, e.g., due to an expiration of its retention policy. At this point, the backup client 150 may request of the monitoring process 120 to provide even lower levels of the tree below this node, anticipating that one may eventually get down to a node level for which there is cached information and which is included in the store. The preference is to avoid accessing the disk as much as possible and to rely on cached information.

It may be preferable that the FSR 124 representation of the file system 110 maintained by the monitoring process 120 be correct and accurate. In particular, if the system crashes, the monitoring process 120 may need to rebuild the tree the next time the monitoring process 120 is started up. To do this, the monitoring process 120 may journal the changes to disk before it operates on them. When the monitoring process 120 starts up, it reads its journal, rebuilds the tree, and writes out a new journal that removes redundant information. That is, if a file changes and then changes again, the old journal may have had two records, however the new journal may have one. Similarly, if different information is cached for the same node, only the latter need be journaled. If an event removes cached information, the cached information may not be journaled. If a node and its parent have the same timestamp, only the child's creation may be journaled. A consideration here is that the monitoring process 120 may need to address the issue that the journal files themselves may be changing and, therefore, generating events. It may be desirable for the monitoring process 120 to note the timestamp on the journal file's node (assuming that the journal file is within the monitor's scope) and not journal the event, setting the journal file's node's timestamp as a special case when the monitoring process 120 starts up. Alternatively, the monitoring process 120 can ensure that the journal is kept somewhere outside of its scope, either in the callback registration or by ignoring the events.

During startup sequence of the machine on which the monitoring process 120 runs it may be desirable for the monitoring process 120 to be one of the first processes started up and one of the last processes to be stopped during normal shutdown. This feature can be combined with an ad hoc specification of files and directories that are known to change outside the life of the monitoring process 120 along with ways of detecting whether they have changed. These files can be simply scanned on start-up and the change stigmata compared with cached info. The monitoring process 120 may be cached as well.

In an embodiment, the monitoring process 120 may test files to determine whether they have changed while the monitoring process 120 was not running. This could be a full scan or, preferably, it can pick files at random and check them to see whether they match what the monitoring process 120 believes, either by checking size and time, looking at the first and last byte ranges, computing a hash, or the like. If a file is found to be different, it is processed as a change event, and the monitoring process 120 may want to change the likelihood of looking at this file (and ones near it) in the future. It may also want to react to finding a change by spot-checking other nearby files. Note that a given file only needs to be checked once during any run of the monitoring process 120. The change in probability may apply for the next time the monitoring process 120 is executed. Note also that this check can be made as low-priority and may preferably be performed when the client machine is in a quiescent state.

An implementation consideration is the memory footprint of the monitoring process 120. There may be millions of files on the system, and it may not be reasonable to keep the entire tree in memory 126 (since this reduces memory available to other processes). One way to help this is to keep a copy of the tree on disk, with only the top-most part (the most recently changed) in memory 126. To accomplish this, the nodes may be augmented with record numbers that include a file indicator and a record (within the file) indicator. If the node is not in memory 126, this record can be used to reconstitute it from the copy in the file. Each node may also contain a "dirty bit" that indicates that the node contains changes that are not reflected in the file 112.

Each node of the FSR 124 may also contain pointers that overlay a doubly-linked list over the tree. This list may be organized so that no node has an earlier timestamp than any node that follows and no node precedes its parent (the timestamps can be equal). When a node's timestamp is updated (and is therefore the latest in tree), it is spliced out and placed in the front. Whenever a node's timestamp is changed or it gets new cached info, its dirty bit is set.

When a node is deleted, it may be removed from the FSR 124. If the node has a record number, the node is added onto a free list, indicating that this record can be reused for another node. When a node is created, it may not have a record number associated with it and it may be marked as dirty. If the creation of this node means that there are more nodes than the system is configured to allow at any time (or some other threshold, e.g., the process uses more memory than is allowed), nodes at the end of the list may be 'swapped out'. If a swapped-out node is dirty, it is written out to its on-disk record. If the dirty swapped-out node does not have an associated record, it pops a node off the free list and uses that one. If there is none, a new record is allocated in the most recent record file. Then the node is replaced in its parent's list of children by a placeholder node that contains just the record number (and, probably, the timestamp) and which is not on the temporal-order list. The savings may happen because this node may have had children, but they would all be placeholder children, and those children may now be considered as 'garbage' by the process's memory management system. This fact may be journaled so that when the system comes up again it should know not to go below this level (or, alternatively, not to mark the node as dirty).

When an event or snapshot request requires referring to a placeholder node, the node needs to be swapped in by loading information from the on-disk record. The newly reconstituted node is marked as clean (e.g., it has the same contents as the on-disk record). It may be desirable to ensure that newly-reconstituted nodes (which may likely have earlier timestamps than other nodes in the tree and, therefore, be at the end of the temporal list) do not get swapped out while they are still being used. In some scenarios, they are only needed as local objects, so this might not be a problem, since the local variables will hold onto the real nodes and the swapping out is easy if they're not dirty. To avoid this, a variant of a Least Recently Used (LRU) strategy may be used to ensure that, the N number (e.g., a thousand) of most recently touched nodes do not get swapped out. The number N, of course, is configurable, and may dynamically change based on various factors.

It may be desirable to have another list of nodes threaded through the tree and move each node to the front when it's touched. When a node is touched, if it's on the list (its pointers are non-null), it's moved to the head. If it's not on the list, it's moved to the head anyway, but the one at the end is removed from the list. To swap out a node, a walk up is performed from the tail until a node is found that is not on the list.

A potential problem may exist if some nodes change frequently due to an increased overhead in the node processing. To address the potential problem, an "active" bit may be added to each node and the monitoring process 120 may contain an array of nodes that have the active bit set. When a node is touched, if the active bit is set, the process is complete. If the array is not full, the node may be added to the array and the bit set. Otherwise, the array is full, and a random number less than the length of the array is generated. The active bit is reset for the node at that position, the active bit is set for the current node, the current node is placed in that slot in the array, and the replaced node is placed at the head of the temporal list. The result is that time is not spent ensuring that nodes which have been touched recently remain in precisely LRU order, increasing efficiency. As with the other scheme, when it is desired to swap out a node, the process is to go to the end of the temporal list and walk toward the head until a node is found that does not have the active bit set, and use that node.

Figure 2A:
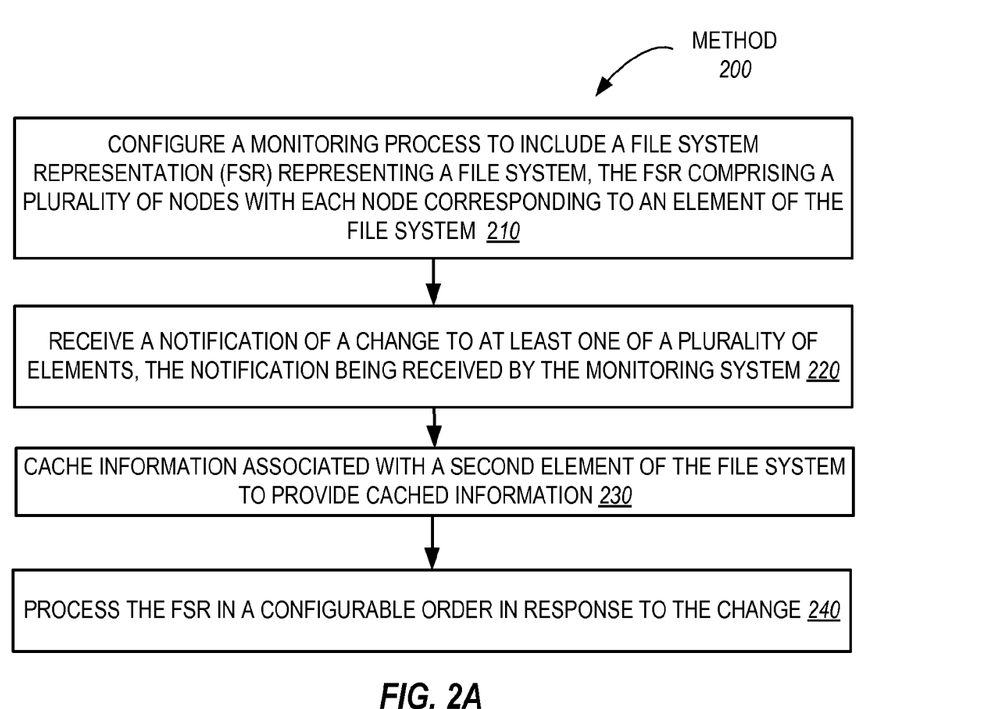
FIG. 2A is a flow chart of an example of a method for performing data backup, according to an embodiment.

FIG. 2A is a flow chart of an example of a method 200 for performing data backup, according to an embodiment. In a particular embodiment, the method 200 is used for performing data backup using the data backup system 100 described with reference to FIG. 1.

At process 210, a monitoring process is configured to include a directed acyclic graph (DAG) representing a file system, the DAG comprising a plurality of nodes with each node corresponding to an element of the file system. At process 220, a notification of a change to at least one element of the file system is received by the monitoring system. At process 230, information associated with a second element of the file system is cached to provide cached information. At process 240, the DAG is processed in response to the change.

It is understood, that various steps described above may be added, omitted, combined, altered, or performed in different order. For example, process 240 may be expanded to include sub processes described with reference to FIG. 2B.

Figure 2B:
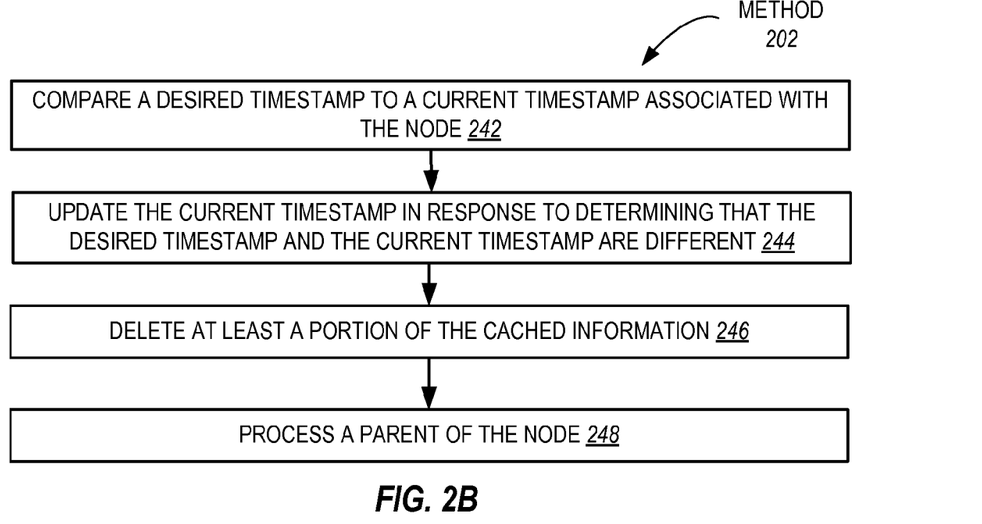
FIG. 2B is a flow chart of an example of a method for processing a file system representation (FSR) described with reference to process 240 of FIG. 2A, according to an embodiment.

FIG. 2B is a flow chart of an example of a method 202 for processing a directed acyclic graph (DAG) described with reference to process 240 of FIG. 2A, according to an embodiment. In a particular embodiment, the method 202 is used for performing data backup using the data backup system 100 described with reference to FIG. 1.

At process 242, a desired timestamp is compared to a current timestamp associated with the node. At process 244, the current timestamp is updated in response to determining that the desired timestamp and the current timestamp are different. At step 246, at least a portion of the cached information is deleted. At step 248, a parent of the node is processed.

It is understood, that various steps described above may be added, omitted, combined, altered, or performed in different order.

Figure 2C:
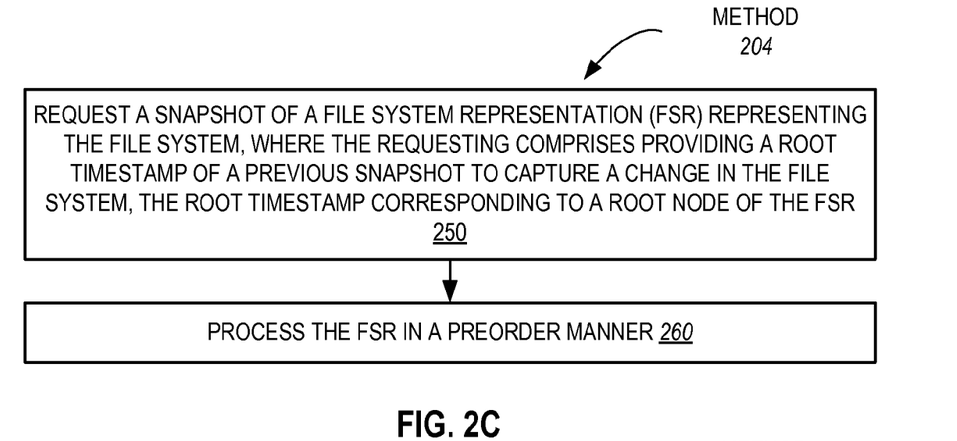
FIG. 2C is a flow chart of an example of a method for performing data backup of a file system, according to an embodiment.

FIG. 2C is a flow chart of a method 204 for performing data backup of a file system, according to an embodiment. In a particular embodiment, the method 204 is used for performing data backup of a file system using the data backup system 100 described with reference to FIG. 1.

At process 250, a snapshot of a directed acyclic graph (DAG) representing the file system is requested, where the requesting comprises providing a root timestamp of a previous snapshot to capture a change in the file system, the root timestamp corresponding to a root node of the DAG. At process 260, the DAG is processed in a preorder manner.

It is understood, that various steps described above may be added, omitted, combined, altered, or performed in different order. For example, the processing of the DAG in a preorder manner may be expanded to include sub processes described with reference to FIG. 2D.

Figure 2D:
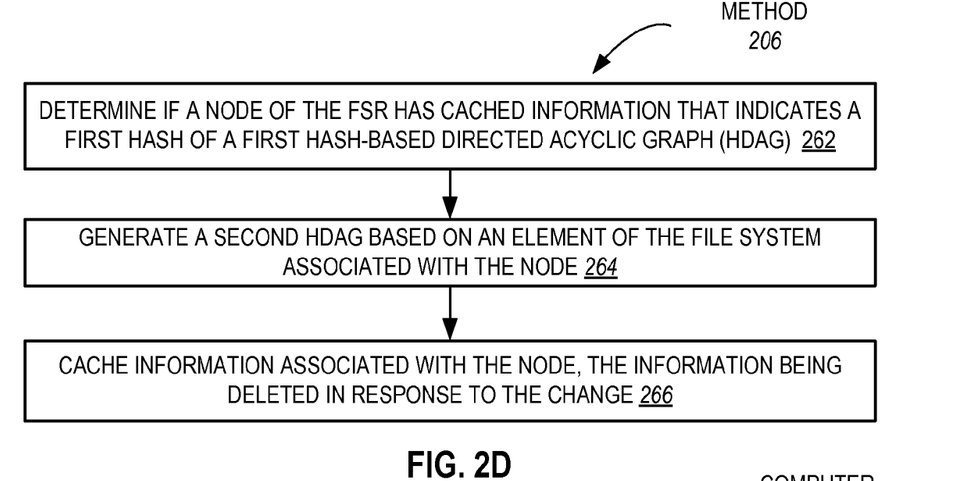
FIG. 2D is a flow chart of an example of a method for processing a file system representation (FSR) in a preorder manner, according to an embodiment.

FIG. 2D is a flow chart of an example of a method 206 for processing a directed acyclic graph (DAG) in a preorder manner, according to an embodiment. In a particular embodiment, the method 206 is used for processing a DAG of the data backup system 100 described with reference to FIG. 1.

At process 262, a determination is made if a node of the DAG has cached information that indicates a first hash of a first hash-based directed acyclic graph (HDAG). At process 264, a second HDAG based on an element of the file system associated with the node is generated. At process 266, information associated with the node is cached, the information being deleted in response to the change. It is understood, that various steps described above may be added, omitted, combined, altered, or performed in different order.

Figure 3:
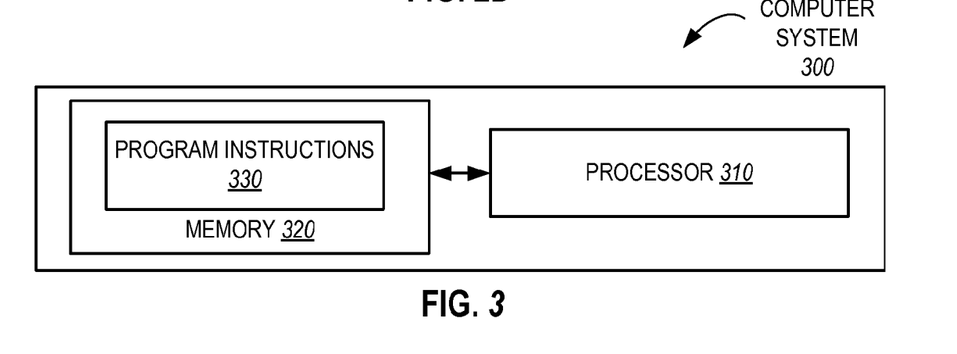
FIG. 3 illustrates a block diagram of an example of a computer system, according to an embodiment.

FIG. 3 illustrates a block diagram of an example of a computer system 300, according to an embodiment. The computer system 300 includes a processor 310 coupled to a memory 320. It is understood that more than one processor may be deployed to match desired computing load. The memory 320 is operable to store program instructions 330 that are executable by the processor 310 to perform one or more functions. It should be understood that the term "computer system" is intended to encompass any device having a processor that is capable of executing program instructions from a memory medium. In a particular embodiment, the various functions, processes, methods 200, 202, 204, 206, and operations described herein may be implemented using the computer system 300. For example, the data backup system 100 and any components thereof, e.g., the monitoring process 120, the client 150, or both may be implemented using one or more ones of the computer system 300.

The various functions, processes, methods, and operations performed or executed by the system 300 can be implemented as the program instructions 330 (also referred to as software or simply programs) that are executable by the processor 310 and various types of computer processors, controllers, microcontrollers, central processing units, microprocessors, digital signal processors, state machines, programmable logic arrays, and the like. In an exemplary, non-depicted embodiment, the computer system 300 may be networked (using wired or wireless networks) with other computer systems.

In various embodiments the program instructions 330 may be implemented in various ways, including procedure-based techniques, component-based techniques, object-oriented techniques, rule-based techniques, among others. The program instructions 330 can be stored on the memory 320 or any computer-readable medium for use by or in connection with any computer-related system or method. A computer-readable medium is an electronic, magnetic, optical, or other physical device or means that can contain or store computer program logic instructions for use by or in connection with a computer-related system, method, process, or procedure. Programs can be embodied in a computer-readable storage medium for use by or in connection with an instruction execution system, device, component, element, or apparatus, such as a system based on a computer or processor, or other system that can fetch instructions from an instruction memory or storage of any appropriate type. A computer-readable storage medium can be any structure, device, component, product, or other means that can store, communicate, propagate, or transport the program for use by or in connection with the instruction execution system, apparatus, or device.

Embodiments disclosed herein provide data backup more efficiently and with improved performance. Scanners can easily and efficiently focus on portions of a file system that have changed since the last time they are scanned (or any other time). A single monitoring process can provide this service to multiple scanners. Scanners can cached information associated with a file that is guaranteed to be deleted if the file changes (thereby indicating that it needs to be recomputed). Such information stays associated with the file even if the file is renamed or (in some embodiments) copied. This can significantly reduce the work that needs to be performed by an HDAG-based backup system, thereby improving the system performance.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although scanners are described with reference to data backup application, it is understood that the methods and systems described herein may be applied in other scanning applications for data synchronization, metadata extraction, indexing, and virus/spyware checking. The illustrative techniques may be used with any suitable data processing configuration and with any suitable servers, computers, and devices. In the claims, unless otherwise indicated the article "a" is to refer to "one or more than one".

What is claimed is:

1. A computer system comprising:
   a computer processor; and
   logic instructions on tangible computer readable storage media and executable by the computer processor to cause the computer processor to:
   configure a monitoring process to include a file system representation (FSR) of a file system, the FSR comprising a plurality of nodes, each node corresponding to a respective one of a plurality of elements of the file system, wherein the FSR is associated with a memory to cache information associated with at least a first element of the file system, wherein the cached information includes an indication of a type of operation that would render the cached information invalid;
   receive a notification of a change to the first element of the file system; and
   process the FSR in response to the change, wherein the processing includes deleting, based on the indication, the cached information in response to the change that involves a modification of the first element.

2. The system of claim 1 further comprising logic instructions on the tangible computer readable storage media and executable by the computer processor to cause the computer processor to:
   compare a first timestamp associated with an event to a current timestamp associated with a given node in the FSR;
   update the current timestamp in response to determining that the first timestamp and the current timestamp are different; and
   process a parent of the given node.

3. The system of claim 1 further comprising logic instructions on the tangible computer readable storage media and executable by the computer processor to cause the computer processor to:
   service, by the monitoring process, a snapshot request, the snapshot request being configured to provide a snapshot of the FSR from a configurable root level to a target level, the target level being specified by a timestamp associated with the snapshot request.

4. The system of claim 1 further comprising logic instructions on the tangible computer readable storage media and executable by the computer processor to cause the computer processor to:
   service, by the monitoring process, a cache request, the cache request being configured to store information describing associations between paths to elements of the file system and typed cached information, the typed cached information including an identifier to distinguish a type of information being cached.

5. The system of claim 4 further comprising logic instructions on the tangible computer readable storage media and executable by the computer processor to cause the computer processor to:
   configure the cache request to include a timestamp;
   compare the timestamp and a node timestamp associated with a given node in the FSR; and
   associate the typed cached information with the given node in response to the comparing.

6. The system of claim 1 further comprising logic instructions on the tangible computer readable storage media and executable by the computer processor to cause the computer processor to:
   configure scanners to focus on portions of the file system that have changed since a last scan, the scanners being configured to receive from the monitoring process cached information associated with the first element that has changed.

7. The system of claim 6 further comprising logic instructions on the tangible computer readable storage media and executable by the computer processor to cause the computer processor to:
   configure the scanners to request a current state of elements of the file system that have changed since a target time; and
   configure the monitoring process to send a response to the request, the response being indicative of a result of the change.

8. The system of claim 1 further comprising logic instructions on the tangible computer readable storage media and executable by the computer processor to cause the computer processor to:
   configure the node of the FSR corresponding to the first element to include a name of the first element, a pointer to a parent of the first element, pointers to children of the first element, and a timestamp representing a time the monitoring process was notified of the change to the first element.

9. The system of claim 1 further comprising logic instructions on the tangible computer readable storage media and executable by the computer processor to cause the computer processor to:
   configure the notification to include a full path of the first element that has changed and an indication of a type of the change, wherein the deleting is further based on the indication of the type of the change.

10. The system of claim 1 wherein the change is one of creating a file, deleting a file, modifying a file, and renaming a file.

11. The system of claim 1 further comprising logic instructions on the tangible computer readable storage media and executable by the computer processor to cause the computer processor to:
    store a copy of a first portion of the FSR on the memory and a second portion of the FSR on a persistent storage device.

12. The system of claim 1 further comprising logic instructions on the tangible computer readable storage media and executable by the computer processor to cause the computer processor to:
    test a second element of the file system to determine whether the second element changed during a time period, the monitoring process being inactive during the time period.

13. The system of claim 1 further comprising logic instructions on the tangible computer readable storage media and executable by the computer processor to cause the computer processor to:
 journal a modification to the FSR to a storage device coupled to the computer processor.

14. The system of claim 1, wherein the FSR includes a directed acyclic graph including the plurality of nodes.

15. A computer program product for data backup, the computer program product comprising logic instructions on a non-transitory computer readable storage executable to cause a computer processor to:
 configure a monitoring process to include a file system representation (FSR) representing a file system, the FSR comprising a plurality of nodes with each node corresponding to an element of the file system, wherein the FSR is associated with a memory to cache information associated with at least a first element of the file system, wherein the cached information includes an indication of a type of operation that would render the cached information invalid;
 receive a notification of a change to the first element of the file system; and
 process the FSR in response to the change, wherein the processing includes deleting, based on the indication, the cached information in response to the change that involves a modification of the first element.

16. The computer program product of claim 15 further comprising logic instructions on the computer readable storage executable to cause the computer processor to:
 configure the monitoring process to service a snapshot request, the snapshot request being configured to provide a snapshot of the FSR from a configurable root level to a target level, the target level being specified by a timestamp associated with the snapshot request.

17. The computer program product of claim 15 further comprising logic instructions on the computer readable storage executable to cause the computer processor to:
 configure the monitoring process to service a cache request, the cache request being configured to store information describing associations between paths to elements of the file system and typed cached information, the typed cached information including an identifier to distinguish a type of information being cached.

18. The computer program product of claim 15, wherein the FSR includes a directed acyclic graph including the plurality of nodes.

19. The computer program product of claim 15, wherein the notification includes an indication of a type of the change, wherein the deleting is further based on the indication of the type of the change.

20. A method executed by a computer processor, comprising:
 configuring a monitoring process to include a file system representation (FSR) representing a file system, the FSR comprising a directed acyclic graph that includes a plurality of nodes with each node corresponding to an element of the file system;
 receiving a notification of a change to a first element of the file system;
 caching information associated with a second element of the file system to provide cached information; and
 processing the FSR in response to the change.

21. The method of claim 20, further comprising:
 configuring the monitoring process to service a snapshot request, the snapshot request being configured to provide a snapshot of the FSR from a configurable root level to a target level, the target level being specified by a timestamp associated with the snapshot request.

22. The method of claim 20, further comprising:
 configuring the monitoring process to service a cache request, the cache request being configured to store information describing associations between paths to elements of the file system and typed cached information, the typed cached information including an identifier to distinguish a type of information being cached.

23. The method of claim 20, further comprising caching information associated with the first element in a memory associated with the FSR, and wherein processing the FSR in response to the change includes deleting the cached information associated with the first element.

24. The method of claim 23, wherein the cached information associated with the first element includes an indication of a type of operation that would render the cached information invalid, and wherein deleting the cached information associated with the first element is based on the indication.

25. The method of claim 24, wherein the notification includes an indication of a type of the change, wherein the deleting is further based on the indication of the type of the change.

* * * * *